United States Patent
Miller et al.

(10) Patent No.: US 9,645,343 B2
(45) Date of Patent: May 9, 2017

(54) SUSPENSION CLAMP FOR CABLES HAVING PREFERENTIAL BEND

(71) Applicant: CORNING OPTICAL COMMUNICATIONS LLC, Hickory, NC (US)

(72) Inventors: Allen Michael Miller, Lenoir, NC (US); David Alan Seddon, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 67 days.

(21) Appl. No.: 14/177,706

(22) Filed: Feb. 11, 2014

(65) Prior Publication Data

US 2014/0231598 A1    Aug. 21, 2014

Related U.S. Application Data

(63) Continuation of application No. PCT/US2012/051156, filed on Aug. 16, 2012.

(60) Provisional application No. 61/524,352, filed on Aug. 17, 2011.

(51) Int. Cl.
*F16L 3/00* (2006.01)
*G02B 6/44* (2006.01)
*H02G 7/05* (2006.01)
*G02B 6/48* (2006.01)

(52) U.S. Cl.
CPC ............ *G02B 6/4471* (2013.01); *G02B 6/483* (2013.01); *H02G 7/053* (2013.01)

(58) Field of Classification Search
CPC ............................................ H02G 7/053
USPC ................ 248/63, 229.2, 229.25, 230.6
See application file for complete search history.

(56) References Cited

U.S. PATENT DOCUMENTS

| | | | |
|---|---|---|---|
| 3,784,137 A | 1/1974 | Eddens et al. | 248/63 |
| 5,435,507 A | 7/1995 | Murphy | 248/74.4 |
| 6,201,184 B1 | 3/2001 | François et al. | 174/43 |
| 6,717,055 B2 * | 4/2004 | Kato | H02G 3/32 173/136 |

(Continued)

FOREIGN PATENT DOCUMENTS

| | | | | |
|---|---|---|---|---|
| CN | 201690182 U | 12/2010 | | |
| EP | 0255030 A1 | 2/1988 | ............... | H02G 7/05 |
| EP | 0889568 B1 | 9/2003 | ............... | H02G 7/05 |

(Continued)

OTHER PUBLICATIONS

Patent Cooperation Treaty, International Search Report and Written Opinion for International Application No. PCT/US2012/051156; Mailing Date Jul. 2, 2013—8 pages.

(Continued)

*Primary Examiner* — Joanne Silbermann (57) ABSTRACT

Suspension clamps for fiber optic cables having a preferential bend are disclosed. The suspension clamp includes a body having a clamping region with a first radius R1 adjacent to the clamping region and a second radius R2 adjacent to the first radius R1 where the first radius is greater than the second radius R2. In one embodiment, the suspension clamp is formed from an first (upper) portion having an attachment structure and a second (lower) portion where the body is generally symmetric about the clamping region.

24 Claims, 5 Drawing Sheets

(56) References Cited

U.S. PATENT DOCUMENTS

2003/0183413 A1   10/2003  Kato
2014/0231598 A1*  8/2014  Miller et al. .................... 248/63

FOREIGN PATENT DOCUMENTS

| GB | 636197 | 4/1950 | |
| JP | 4-368413 A | 12/1992 | ............... H02G 7/02 |
| WO | WO 97/07579 | 2/1997 | ............... H02G 7/05 |
| WO | WO 2013/025915 A2 | 2/2013 | ............... H02G 7/05 |

OTHER PUBLICATIONS

Morlynn Insulators, Clamp Top Clamps, Aluminium and Copper Conductors—Admitted Art.
Chinese Search Report for Application No. 201280040015.X, dated Nov. 23, 2015, 2 pages.
English Translation of CN201280040015.X Second Office Action Dated Sep. 29, 2016; 10 pages; Chinese Patent Office.

* cited by examiner

SUSPENSION CLAMP FOR CABLES HAVING PREFERENTIAL BEND

RELATED APPLICATIONS

This application is a continuation of International Application No. PCT/US12/51156, filed Aug. 16, 2012, which claims the benefit of priority to U.S. Application No. 61/524,352, filed Aug. 17, 2011, both applications being incorporated herein by reference.

BACKGROUND

The disclosure is directed to suspension clamps for aerial fiber optic cables. More specifically, the disclosure is directed to suspension clamps for aerial fiber optic cables having a preferential bend.

Optical fiber is increasingly being used for a variety of applications, including but not limited to broadband voice, video, and data transmission. Optical networks may use fiber optic cables in aerial and/or buried applications and each have special needs. For example, aerial applications require hardware such as clamps for hanging the cables under the tension of their own weight along with any environmental effects.

Aerial installations using round cables that have a generally uniform moments of inertia about their bending axes typically employ suspension clamps that have an elastomer insert and/or an axisymmetric radius feature at the clamp ends that help control the bend radius of the cable where it exits the clamp. However, cables having a preferential bend characteristic have different needs since the cable has different moments of interia about the bending axes of the cable. Cables with a preferential bend characteristic that are bent about the major axis will laterally torsionally buckle under sufficiently high lateral loads. Consequently, cables supported by conventional suspension clamps may twist in addition to bend beyond the clamp support limits.

Recent cable developments include the use of dry fiber optic cables having non-round cross-sections with preferential bend characteristics. Consequently, there is an unresolved need for suspension clamps for these types of cables

SUMMARY

The disclosure is directed to suspension clamps for fiber optic cables having a preferential bend characteristic. In one aspect, the suspension clamp includes a body having a clamping region and a first radius R1 adjacent to the clamping region and a second radius R2 adjacent to the first radius R1, wherein the first radius R1 is greater than the second radius R2.

In another aspect, the suspension clamp includes a body having a first portion and a second portion. The body has a clamping region and a first radius R1 adjacent to the clamping region and a second radius R2 adjacent to the first radius R1, wherein the first radius R1 is greater than the second radius R2.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the preferred embodiments of the disclosure, examples of which are illustrated in the accompanying drawings. Whenever possible, like reference numbers will be used to refer to like components or parts.

The suspension clamps disclosed are useful for securing self supporting aerial cables with preferential bends to supporting structures such as distribution poles and the like. As used herein, "preferential bend characteristic(s)" describe cables that have a major and a minor moments of inertia along different planes with respective strong and weak bending axes respectively. Aerial cables can experience high stress conditions during severe weather conditions. For example, aerial cables can experience cable deadweight plus additional weight of ice loading in a storm which conditions can be further worsened by wind loading that may cause cable galloping and the like. This combination loading doesn't act in the same axis of the cable. Specifically, deadweight plus ice loading and wind loading generally act nearly 90 degrees apart so that preferential bend cables which are rigidly attached to poles will be bent about the strong axis for one of the load directions. However, fiber optic cables with glass reinforced strength elements (GRPs) are sensitive to the small bend radii about the strong axis and suspension clamps require unique features to maintain large bend radii thereby limiting the strain in the GRPs of the cable.

Figure 2:
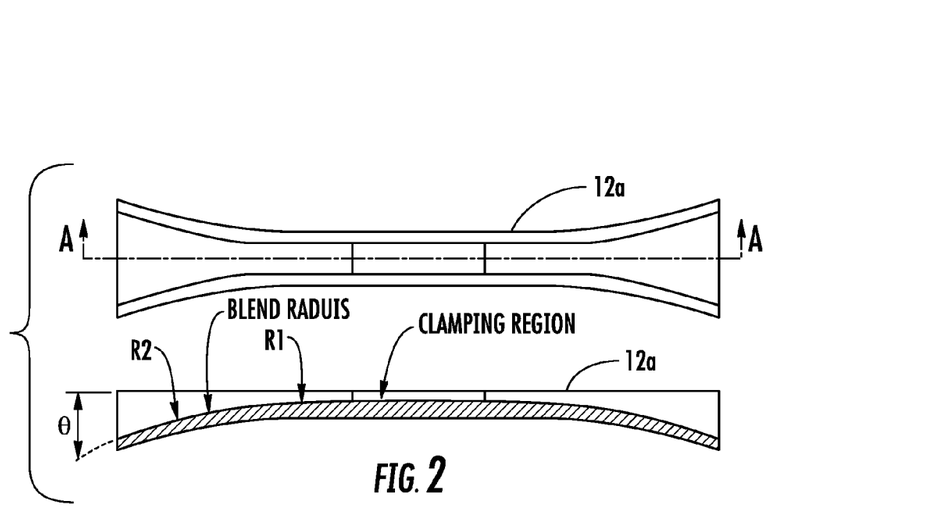
FIG. 2 shows a plan view of a portion of a suspension clamp along with section A-A showing geometry of the same.

The suspension clamp discussed herein limits the strain in the GRPs of a preferential bend cable by ensuring the cable is primarily bent about the weak axis from deadweight, ice, wind, misalignment, and/or clamp rotation loads. The suspension clamp rotates about the Z axis to orient itself such that the cable is primarily bent about the weak axis thereby inhibiting lateral torsional buckling and the associated increased GRP strain and ribbon cavity distortion. The unique design has a center clamping section that secures the cable to the clamp to carry differential cable tension. The clamping section transitions smoothly (without discontinuity) into a section with a radius R1 as shown in FIG. 2. Radius R1 can not be axisymmetric and tangent to the clamping region because the preferential bend cable is not circular. Reference will now be made in detail to the preferred embodiments, examples of which are illustrated in the accompanying drawings. Whenever possible, like reference numbers will be used to refer to like components or parts.

Figure 1:
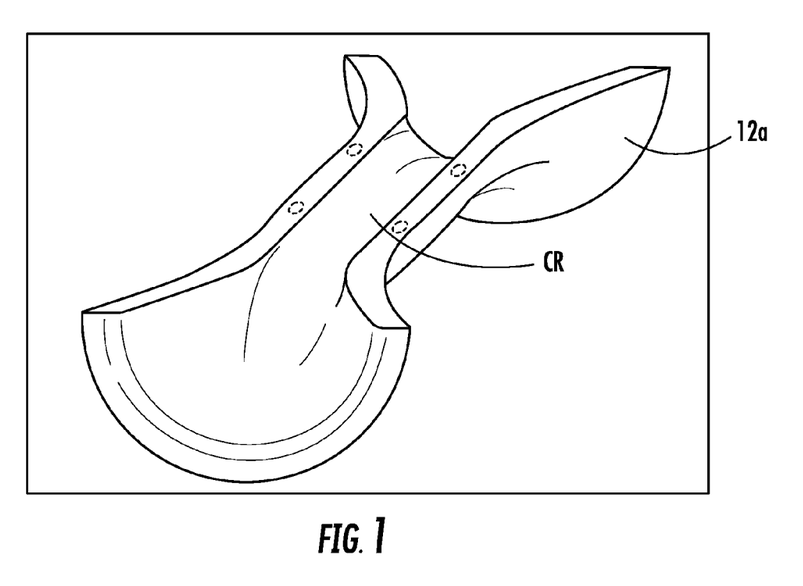
FIG. 1 depicts a perspective view of a portion of a suspension clamp for securing an aerial cable having a preferential bend characteristic.
Figure 3:
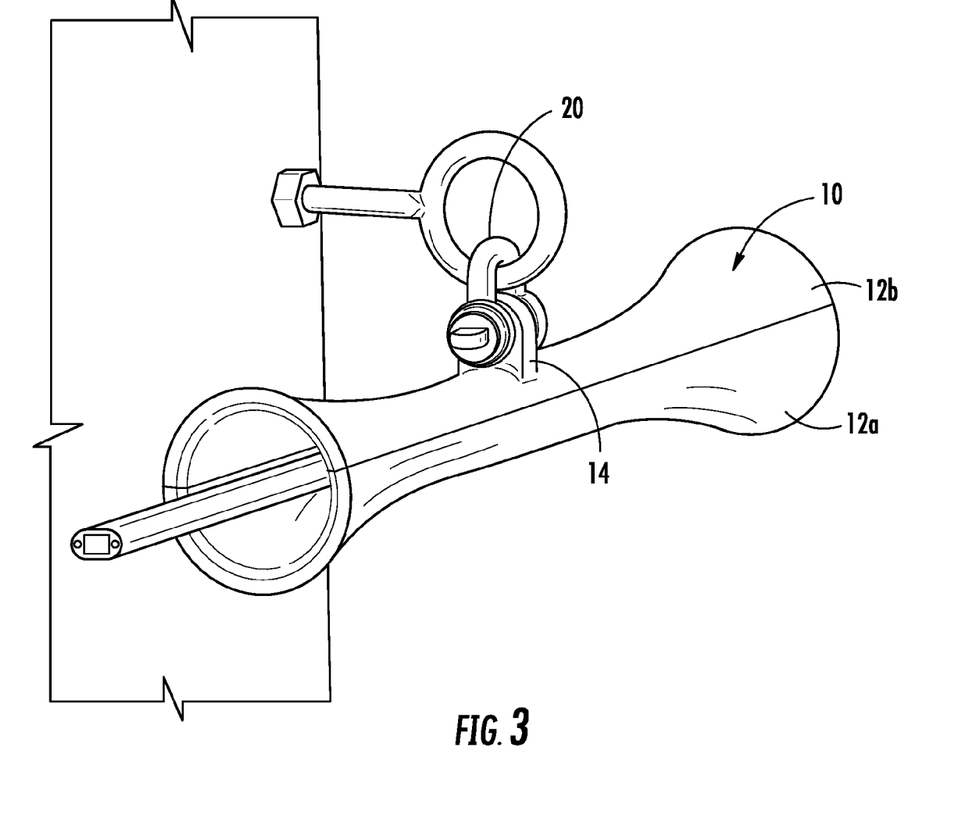
FIG. 3 depicts a perspective view of a cable secured to a suspension clamp that is mounted to a pole in an aerial cable deployment during dead weight loading.

FIGS. 1 and 2 depict cross-sectional views showing the unique geometry of a suspension clamp 10 that is shown in FIG. 3. Suspension clamp 10 has a body 12 having a clamping region CR. Clamping region CR is sized for one or more particularly sized cables. Body is preferably made as two or more portions 12a so it can easily clamp about the cable instead of being threaded onto an end. Moreover, the two or more portions may be the same or different 12a,12b. The suspension clamp 10 controls the bend radius of the cable and the respective strength members within the cable such as the GRPs to acceptable levels when the appropriate choice of a first radius to a second radius is selected (R1>R2) and an appropriate blend radius between R1 and R2 is used as best shown in FIG. 2. A portion of body 12 such as the first (upper) portion may include an attachment structure 14 for mounting suspension clamp 10. For instance, FIG. 3 includes attachment structure 14 configured as a tab having a hole that is integrally formed with the body such as an upper portion that cooperates with a clevis 20 (i.e., shackle) that is secured to the tab with a pin or bolt. The attachment structure such the clevis may be a portion of the body or a portion of a clamping mechanism as desired. Simply stated, the attachment structure 14 such as the tab allows the clamp to pivot so the cable can bend about its weak axis under all load conditions. Moreover, any suitable attachment structure may be used with the concepts disclosed herein. For instance, the attachment structure may be a safety-engineered hoist ring that bolts to the suspension clamp or in other variations a ball and socket attachment structure may be used.

A mounted suspension clamp assembly is shown in FIG. 3 in an orientation from a static gravity load such as cable deadweight or deadweight plus ice loading. Note that clamping mechanism retaining the upper and lower halves of the body 12 together is not visible, but may be any suitable structure for holding the halves together. By way or example, the clamping mechanism could be mechanical fasteners such as bolting the halves together using the bore holes for fasteners such as shown in FIG. 1, clamps such as external band type clamps or other suitable types of retention system for hold the portions together about the cable. In the embodiment of FIG. 3, the body 12 is generally symmetric about the clamping region CR. In other words, the body is generally symmetric about a vertical plane passing through the clamping region CR.

Figure 4:
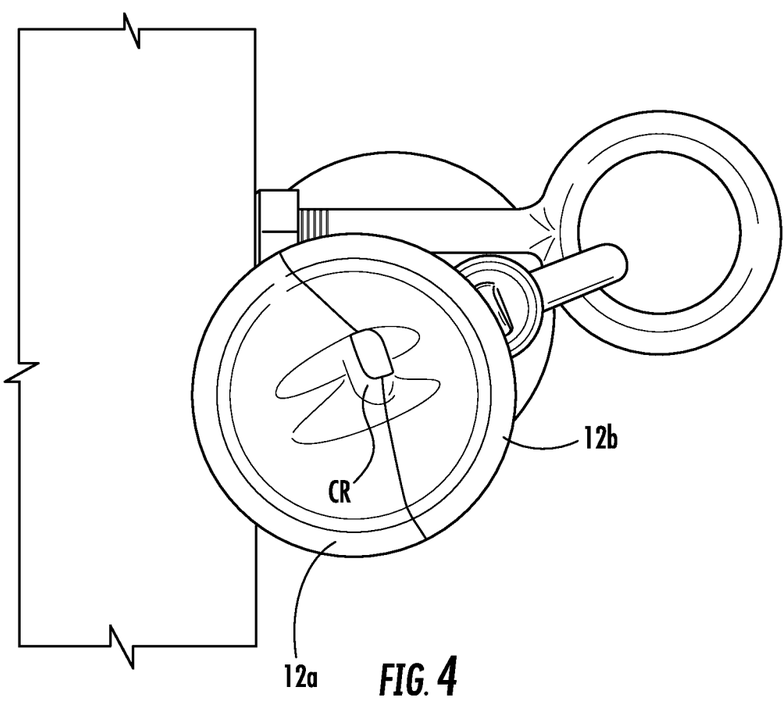
FIG. 4 depicts an end view of the suspension clamp of FIG. 3 with the cable removed showing a how the suspension clamp re-orients the cable during a wind-loading event.

Additionally, the suspension clamp FIG. 4 shows the ability of the clamp to rotate about the Z axis to align with the −X wind direction to keep the cable oriented so that it primarily bends about the weak axis and inhibits lateral torsional buckling and limits the GRP strain. The suspension clamp inhibits GRP strain from exceeding about 2%, and preferably about 1.5% for short-term loading and 1% for long-term loading maintaining GRP structural integrity. Simply stated, the suspension clamp 10 provides rotation of the same about the attachment structure so that lateral torsional buckling is inhibited under wind loading. In advantageous embodiments, the attachment structure and/or mounting structure such as the tab and clevis allow movement about three axes (i.e., X-direction, Y-direction and Z-direction) to accommodate the cable path (i.e., the pole alignment, placement, and/or differential tension in the cable) along with enabling bending about the weak bending axis of the cable.

Figure 5:
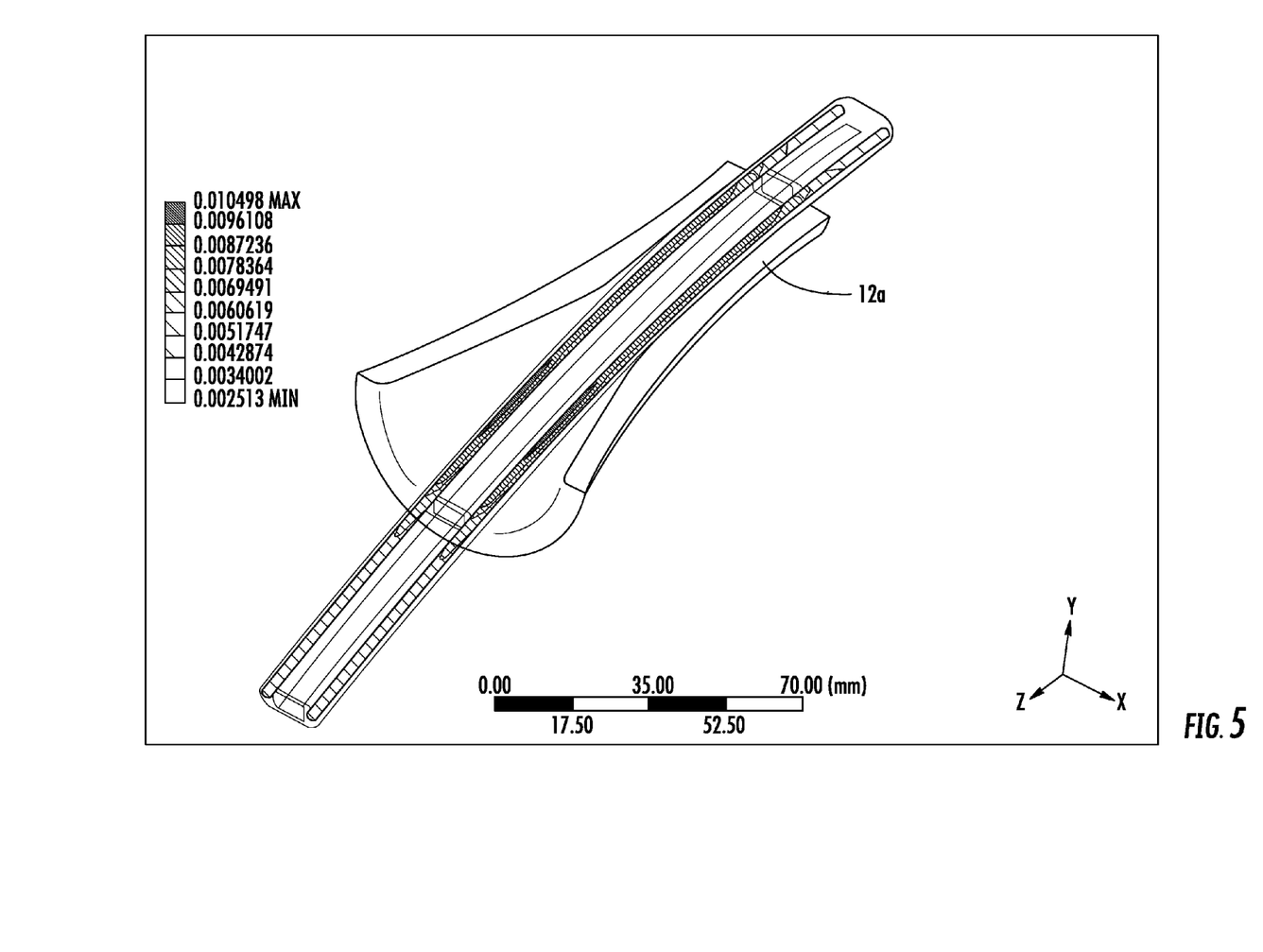
FIG. 5 shows finite element modeling for a representative cable design experiencing a predetermined tension at a given load angle.

FIG. 5 shows finite element analysis (FEA) resulting GRP strain while an RPX type cable available from Corning Cable Systems has 3114 Newton of tension applied at a 20° Load Angle from XZ Plane. The load angle is a combination of sag, misalignment and clamp rotation under differential cable tension across the clamp (unequal spans). The acceptable load angle can be increased by increasing θ beyond 20° in FIG. 2.

Figure 6:
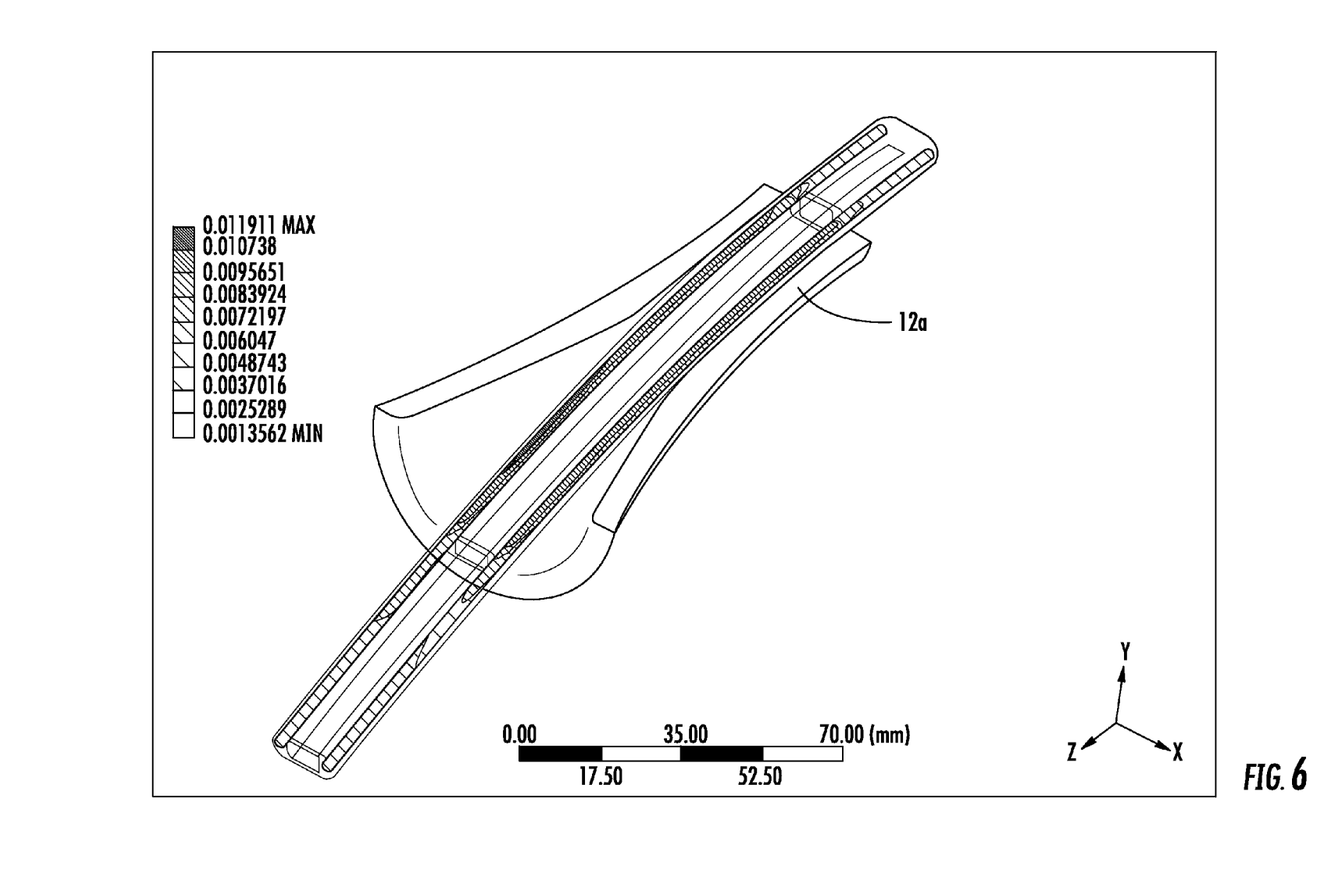
FIG. 6 shows finite element modeling for a representative cable design experiencing a predetermined tension at a given load angle and a 10 degree load vector rotation about Z from incidental wind-loading.

FIG. 6 shows FEA strain results of the effect of small incidental side loading on the GRP strain for the same cable design as FIG. 5. The load vector is rotated 20° about X then 10° about the Z axis. The 10° off axis loading on the cable causes a 15% increase in GRP strain.

Results from FEA analysis reveals suitable geometry for creating the suspension clamp for maintaining desired bending characteristics. For instance, the region at a first radius R1 is an extrusion normal to Section A-A in FIG. 2. The region at a second radius R2 transitions smoothly with a blend from R1 to R2 to where the first radius R1 is slightly larger than the second radius R2 to minimize the discontinuity between sections and the effect on GRP strain. Moreover, Section 2 is axisymmetric to enable the clamp to limit strength member strain (i.e., GRP strain) during small, incidental side loading (strong axis bending) that may result during dynamic wind loading. Preferably, sharp corners in the interior of the body should be avoided to reduce stress concentrations as generally shown in the Figs. Sharp corner in the interior of the suspension clamp may be relieved by providing a contour that generally matches the outer shape of the cable along with a clearance such as providing a fillet as desired at R1.

The GRP strain in an ideal clamp geometry (without discontinuities at the transitions between regions) is determined with Equation 1 with the assumption that the GRPs carry all of the cable tension. In other words, the theoretical minimum GRP strain for the ideal clamp geometry is given by the equation for a beam under tension and bending in Equation 1 for determining a blend radius for the suspension clamp.

$$\epsilon = \text{membrane strain} + \text{bending strain} = T/(AE) + r/R \qquad \text{Equation (1)}$$

Where: $\epsilon$—is GRP strain
T—is cable tension
A—is total GRP cross sectional area
E—is the GRP Young's Modulus
r—is the GRP radius
R—is the bend radius of the GRP (which approaches the radius of the clamp)

The theoretical minimum clamp radius is determined by rearranging equation 1 to yield Equation 2.

$$R_{min} = r/(\epsilon - T/(AE)) \qquad \text{Equation (2)}$$

There are working ranges for the suspension clamp design, but these working ranges can vary based on the specific cable design such as geometry and materials used so the design may vary. Further, the theoretical minimum may depend on the radius blend between R1 and R2 and the acceptable strain limit for the strength elements (GRPs) which are typically on the order of 1% for long-term strains and 1.5% for short-term strains. The principals for making the suspension clamps that work with cables having a preferential bend characteristic are having a mounting configuration that permits the clamp to align with the load direction (rotation about the Z axis), sufficiently large radii R1 and R2, and a transition region between radius R1 and radius R2. Stated another way, the mounting configuration is selected so that the suspension clamp rotates under load, thereby providing bending of the cable about its weak axis. Practical values of the radii for suspension clamps disclosed herein are R1>R2>$R_{min}$ of the cable. By way of specific example based upon the nominal dimension of the 144-fiber RPX cable ranges are, R1=420 mm±10, R2=400 mm±10 and $R_{min}$=365 mm or greater for maintaining the desired performance rating. In other words, different assumptions for maximum loading conditions may also influence results along with cables having different materials, geometry and/or dimensions.

Other design aspects for the suspension clamp may also influence the bend characteristics experienced by the fiber optic cable. By way of example, a length ratio (LR) of a half-length of the suspension clamp (L/2) to a centerline offset length may be controlled by selecting dimensions for providing a suitable geometry to address differential loading conditions that may be experienced. The centerline offset length is the distance between the longitudinal centerline of the suspension clamp and the centerline of hole in the attachment structure that acts as the pivot point for the suspension clamp. In preferred embodiments, the suitable length ratio (LR) is 4 or greater (i.e., defining an angle of about 75 degrees or more, but preferably no more than 90 degrees), but other ratios are possible. Of course, these dimensions for the suspension clamp will be influenced by the particular cable design and may have other suitable ranges for different cable constructions.

Also disclosed are methods of attaching a cable having a preferential bend characteristic to a suspension clamp that includes the steps of providing a cable having a preferential bend characteristic such as shown in FIG. 3, placing the cable in the suspension clamp having a body with a clamping region having a first radius R1 adjacent to a clamping region CR and a second radius R2 adjacent to the first radius R1, where the first radius R1 is greater than the second radius R2, and securing the suspension clamp to a structure such as an eyelet attached to a pole. Additionally, the suspension clamp may include other structure or features as discussed herein.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A suspension clamp for a cable having a preferential bend characteristic, comprising:
   a body;
   wherein the body has a clamping region and a first radius R1 adjacent to the clamping region and a second radius R2 adjacent to the first radius R1, wherein the first radius R1 is greater than the second radius R2, and the first radius R1 is not axisymmetric to a longitudinal centerline of the suspension clamp and the first radius is tangent to the clamping region.

2. The suspension clamp of claim 1, wherein the body is formed from two or more portions.

3. The suspension clamp of claim 1, further including at least one attachment structure.

4. The suspension clamp of claim 3, the attachment structure being a tab integrally formed with the body.

5. The suspension clamp of claim 1, further including at least one clamping mechanism.

6. The suspension clamp of claim 1, further including a blend radius between the first radius and the second radius.

7. The suspension clamp of claim 1, the body being generally symmetric about the clamping region.

8. The suspension clamp of claim 1, further including a blend radius between the first radius R1 and the second radius R2 and a length ratio of 4 or greater, wherein the length ratio is the ratio between a half-length of the suspension clamp (1/2) to a centerline offset length that is a distance between the longitudinal centerline of the suspension clamp and a centerline of a hole in an attachment structure that acts as the pivot point for the suspension clamp.

9. The suspension claim of claim 1, wherein the second radius R2 is axisymmetric to the longitudinal centerline of the suspension clamp.

10. A suspension clamp for a cable having a preferential bend characteristic, comprising:
    a body formed from a first portion and a second portion;
    wherein the body has a clamping region and a first radius R1 adjacent to the clamping region and a second radius R2 adjacent to the first radius R1, wherein:
    the first radius R1 is greater than the second radius R2;
    the first radius R1 is not axisymmetric to a longitudinal centerline of the suspension clamp and the first radius is tangent to the clamping region; and
    the second radius R2 is axisymmetric to the longitudinal centerline of the suspension clamp.

11. The suspension clamp of claim 10, further including at least one attachment structure.

12. The suspension clamp of claim 11, the attachment structure being a tab integrally formed with the body.

13. The suspension clamp of claim 10, further including at least one clamping mechanism for holding the first portion with the section portion.

14. The suspension clamp of claim 10, further including a blend radius between the first radius and the second radius.

15. The suspension clamp of claim 10, the body being generally symmetric about the clamping region.

16. The suspension clamp of claim 10 with a mounting configuration that permits the clamp to align with the load direction so the rotation is about the Z axis.

17. The suspension clamp of claim 10, further including a blend radius between the first radius R1 and the second radius R2 and a length ratio of 4 or greater, wherein the length ratio is the ratio between a half-length of the suspension clamp (1/2) to a centerline offset length that is a distance between the longitudinal centerline of the suspension clamp and a centerline of a hole in an attachment structure that acts as the pivot point for the suspension clamp.

18. A method of attaching a cable having a preferential bend characteristic to a suspension clamp, comprising the steps of:
    providing a cable having a preferential bend characteristic;

placing the cable in the suspension clamp, the suspension clamp having a body with a clamping region with a first radius R1 adjacent to a clamping region and a second radius R2 adjacent to the first radius, wherein the first radius is greater than the second radius R2, and the first radius R1 is not axisymmetric to a longitudinal centerline of the suspension clamp and the first radius is tangent to the clamping region; and securing the suspension clamp to a structure.

19. The method of claim 18, the body of the suspension clamp formed from two portions.

20. The method of claim 18, the suspension clamp including at least one attachment structure.

21. The method of claim 18, further including at least one clamping mechanism.

22. The method of claim 18, the suspension clamp further including a blend radius between a first radius R1 and a second radius R2.

23. The method of claim 18, the body of the suspension clamp being generally symmetric about the clamping region.

24. The method of claim 18, wherein the second radius R2 is axisymmetric to the longitudinal centerline of the suspension clamp.

\* \* \* \* \*